United States Patent [19]

Lewicki, Jr. et al.

[11] 4,003,114
[45] Jan. 18, 1977

[54] COMPRESSIBLE SLEEVE EMBOSSING ROLL

[75] Inventors: Walter J. Lewicki, Jr.; Jacob A. Otthofer, Jr., both of Lancaster, Pa.

[73] Assignee: Armstrong Cork Company, Lancaster, Pa.

[22] Filed: Feb. 25, 1976

[21] Appl. No.: 661,279

[52] U.S. Cl. .................................. 29/125; 29/132
[51] Int. Cl.² ........................................ B21B 31/08
[58] Field of Search .............. 29/125, 132, 129.5, 29/123; 425/363, 365

[56] References Cited

UNITED STATES PATENTS

| | | | |
|---|---|---|---|
| 1,727,978 | 9/1929 | Huebner | 29/125 X |
| 1,732,042 | 10/1929 | Fox | 29/125 X |
| 1,843,679 | 2/1932 | Jones | 29/132 X |
| 1,883,183 | 10/1932 | Weber | 29/132 X |
| 1,883,184 | 10/1932 | Weber | 29/125 X |
| 2,762,632 | 7/1956 | Winstead | 425/363 |

*Primary Examiner*—Alfred R. Guest

[57] ABSTRACT

The invention is directed to sleeves of high heat conductivity material being press fit on a water cooled shaft and held in position by pins and appropriate locking units of a specific torque.

4 Claims, 1 Drawing Figure

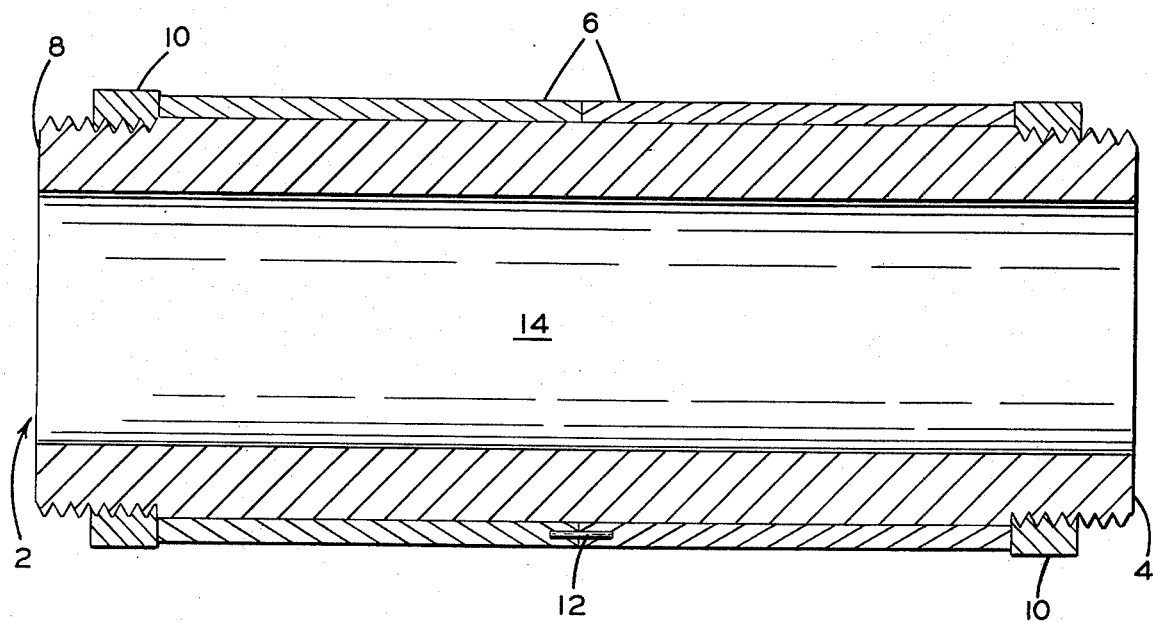

COMPRESSIBLE SLEEVE EMBOSSING ROLL

BACKGROUND OF THE INVENTION

1. Field of the Invention

The invention is directed to an embossing roll and, more particularly, to an embossing roll utilized to emboss floor covering products.

2. Description of the Prior Art

U.S. Pat. No. 1,883,185 teaches the use of plural sleeves locked together with a pin 5 and held in place by nuts on a threaded mandrel. Additional pins 14 and 15 are utilized to lock the sleeves together and there is a snug fit between the mandrel and the embossing sleeves.

U.S. Pat. No. 2,752,632 teaches the use of cooling water with a steel mandrel having a copper embossing surface.

SUMMARY OF THE INVENTION

The invention is directed to the place of plural sleeves of a high conductivity material on a mandrel of a lower conductivity material. The sleeves have pins around their periphery so that the sleeves will be locked together to prevent relative movement thereof. An interference fit exists between the inside diameter of the sleeves and the outside diameter of the mandrel. The mandrel is provided with means for the water cooling of the assembled product and the mandrel is provided with threaded ends so that nuts fastened to a specific torque will apply pressure against the plural sleeves to hold them in place on the mandrel.

DESCRIPTION OF THE DRAWING

The FIGURE of the drawing is a cross-sectional view of the invention herein.

Description of the Preferred Embodiment

The embossing roll assembly 2 is shown in the drawing. The mandrel 4 is normally made of steel which has a conductivity of 26.2 Btu's per hour per cubic foot per degree Fahrenheit per foot. The steel has a thermal expansion of $6 \times 10^{-6}$ inches per inch per degree Fahrenheit. Over this mandrel is placed a plurality of sleeves 6 which will be composed of a material which has a higher conductivity and greater thermal expansion than the mandrel material. Typical of materials that can be utilized for the sleeves are aluminum, magnesium and copper. Aluminum has a conductivity of 130 Btu's per hour per square foot per degree Fahrenheit per foot and a thermal expansion of $13.3 \times 10^{-6}$ inches per inch per degree Fahrenheit. Magnesium has a conductivity of 99 Btu's per hour per square foot per degree Fahrenheit per foot and a thermal expansion of $14.5 \times 10^{-6}$ inches per inch per degree Fahrenheit. Finally, copper has a conductivity of 232 Btu's per hour per square foot per degree Fahrenheit per foot, and a thermal expansion of $9.2 \times 10^{-6}$ inches per inch per degree Fahrenheit. The sleeves are placed upon the mandrel with an interference fit therebetween. By an interference fit is meant that the outside diameter of the mandrel is the same size as, or up to 0.002 of an inch greater than, the inside diameter of the sleeves 6. The mandrel 4 is provided with threaded ends 8, and positioned thereon are nuts 10 which press against the ends of the sleeves to hold the sleeves in position.

In addition, the sleeves are provided with pins 12 around their periphery where one sleeve is adjacent to another sleeve so that the sleeves are pinned together to prevent relative movement of the sleeves. The center 14 of the mandrel is hollow to permit cooling water to be passed therethrough to cool the embossing roll 2 when it is in operation embossing a hot floor covering sheet. The cooling water is utilized to withdraw the heat which is absorbed by the embossing roll, and this heat is absorbed by the embossing roll so as to freeze the image in the hot floor covering material being embossed.

A typical embossing roll structure 2 would be made with a steel mandrel and magnesium sleeves. The magnesium sleeves, with 0.250 inch thick walls, would be pressed upon the steel mandrel at a nominal 70° F. room tenperature with a 0.002 of an inch interference fit. This means that the outside diameter of the mandrel is 0.002 greater than the inside diameter of the sleeves. Approximately 2 pins would be used around the periphery of each adjacent edge of adjacent sleeves, and these pins would be approximately 0.75 inches long and 0.094 inches in diameter. After the appropriate number of sleeves have been pressed upon the mandrel, the nuts on the end of the mandrel are then tightened up against the two ends of the series of sleeves pressed together upon the mandrel. These nuts are then pulled down to a torque of approximately 8,000 inch pounds. When cooling water is passed through the embossing roll 2, the embossing roll may be chilled as low as 50° F. When the embossing roll is in operation engaging hot floor covering material and embossing it, the temperature of the embossing roll may rise as high as 120° F. As the embossing roll moves through this temperature range of 50° F. to 120° F., the stress in the magnesium due to its difference in thermal conductivity and thermal expansion from the steel mandrel will subject the magnesium sleeves to a plurality of internal stresses. The magnesium has a modulus of elasticity of approximately $5 \times 10^{-6}$ with a compression yield point of 5,000 pounds per square inch. The magnesium sleeves assembled upon the steel mandrel to the torque above described and moving through the temperature range given will be under various stresses as the temperature changes, but at no time will the stress on the magnesium reach the yield point of the magnesium, i.e. 5,000 pounds per square inch of stress. Should this limit be exceeded, cold flow exists in the magnesium and the sleeves will be distorted beyond repair. Should the above-described magnesium sleeve steel mandrel structure be assembled with torque on the nuts of substantially less than 8,000 inch pounds, then there exists the possibility that during the cooling cycle, the magnesium would shrink in size substantially less than the steel and gaps could appear between adjacent magnesium sleeves. This would then provide the embossed pattern with an objectionable line effect.

The invention herein requires a combination of four features. First is the selection of a sleeve and mandrel of appropriate thermal conductivity and thermal expansion. These are then assembled with (2) an appropriate interference fit, (3) an appropriate pin assembly, and (4) an appropriate end torque to hold the magnesium sleeves in position on the steel mandrel without: rotation of the sleeves relative the steel mandrel, slipping of the individual sleeves relative to each other, and finally, development of a gap between adjacent sleeves.

What is claimed is:

1. An embossing roll which is composed of a hollow material mandrel having means therethrough to permit the passage of a cooling fluid and a plurality of sleeves pressed on the outer surface thereof, said sleeves being of a material having a higher thermal conductivity and higher thermal expansion than the material of the mandrel, pins locking together adjacent sleeves to prevent relative movement thereof and locking means on the ends of the mandrel for applying a pressure to the plural sleeves to hold the plural sleeves together.

2. The embossing roll of claim 1 wherein the sleeves are pressed upon the mandrel with an interference fit therebetween of 0.002 of an inch.

3. The embossing roll of claim 2 wherein the locking means are fastened down to a torque of approximately 8,000 inch pounds.

4. The embossing roll of claim 3 wherein the sleeves are made of magnesium and the mandrel is made of steel.

* * * * *